(12) United States Patent
Kisailus et al.

(10) Patent No.: US 9,670,069 B2
(45) Date of Patent: Jun. 6, 2017

(54) METHODS OF MAKING METAL-OXIDES AND USES THEREOF FOR WATER TREATMENT AND ENERGY APPLICATIONS

(75) Inventors: David Kisailus, Riverside, CA (US); Nichola Kinsinger, Riverside, CA (US)

(73) Assignee: The Regents of the University of California, Oakland, CA (US)

(*) Notice: Subject to any disclaimer, the term of this patent is extended or adjusted under 35 U.S.C. 154(b) by 1401 days.

(21) Appl. No.: 13/500,716

(22) PCT Filed: Oct. 8, 2010

(86) PCT No.: PCT/US2010/052079
§ 371 (c)(1),
(2), (4) Date: May 16, 2012

(87) PCT Pub. No.: WO2011/044518
PCT Pub. Date: Apr. 14, 2011

(65) Prior Publication Data
US 2012/0267321 A1    Oct. 25, 2012

Related U.S. Application Data

(60) Provisional application No. 61/249,899, filed on Oct. 8, 2009.

(51) Int. Cl.
*C02F 1/72* (2006.01)
*C01G 1/02* (2006.01)
(Continued)

(52) U.S. Cl.
CPC ............... *C01G 1/02* (2013.01); *C01G 1/00* (2013.01); *C01G 1/12* (2013.01); *C01G 23/053* (2013.01);
(Continued)

(58) Field of Classification Search
CPC ... C01G 1/00; C01G 1/02; C01G 1/12; C01G 23/053; C01G 28/02; C01G 49/02;
(Continued)

(56) References Cited

U.S. PATENT DOCUMENTS

| 6,589,457 B1* | 7/2003 | Li ................... C23C 18/1216 216/56 |
| 7,326,399 B2* | 2/2008 | Zhou ..................... B82Y 30/00 106/436 |

(Continued)

FOREIGN PATENT DOCUMENTS

| EP | 2463237 A1 | 6/2012 |
| WO | 2009011658 A1 | 1/2009 |

OTHER PUBLICATIONS

Kolen'Ko et al., "Photocatalytic properties or titania powders prepared by hydrothermal method," Applied Catalysis B: Environmetnal, 2004, pp. 51-58, 2004.
(Continued)

*Primary Examiner* — Walter D Griffin
*Assistant Examiner* — Cameron Allen
(74) *Attorney, Agent, or Firm* — Gavrilovich, Dodd & Lindsey LLP

(57) ABSTRACT

The disclosure provides relates to compositions and methods for water treatment. It also addresses a method for synthesizing $TiO_2$ (and other metal oxides) with or without dopants. This method enables control over size, phase, morphology and porosity and specific surface area of these materials. The disclosure also provides metal oxide composites that can be used in photocatalysts, photovoltaics, and solar hydrogen applications.

12 Claims, 10 Drawing Sheets

(51) Int. Cl.
*C01G 1/00* (2006.01)
*C01G 1/12* (2006.01)
*C01G 23/053* (2006.01)
*C01G 25/02* (2006.01)
*C01G 28/02* (2006.01)
*C01G 49/02* (2006.01)
*C02F 1/32* (2006.01)
*H01G 9/20* (2006.01)

(52) U.S. Cl.
CPC ............. *C01G 25/02* (2013.01); *C01G 28/02* (2013.01); *C01G 49/02* (2013.01); *C02F 1/325* (2013.01); *C01P 2006/40* (2013.01); *C02F 1/725* (2013.01); *C02F 2305/08* (2013.01); *H01G 9/2031* (2013.01); *H01G 9/2059* (2013.01); *Y02W 10/37* (2015.05)

(58) Field of Classification Search
CPC ...... C02F 1/325; C02F 1/725; C02F 2305/08; Y02W 10/37; C01P 2006/40; H01G 9/2031; H01G 9/2059
See application file for complete search history.

(56) References Cited

U.S. PATENT DOCUMENTS

2003/0161959 A1* 8/2003 Kodas ................... C09D 11/30
 427/376.2
2007/0037991 A1* 2/2007 Rizkalla ................. B01J 21/04
 549/533

OTHER PUBLICATIONS

Morawski et al., "Carbon modified TiO2 photocatalysts for water purification," Polish J. of Chemical Tech., 2009, pp. 46-50, vol. 11, No. 2.

Yang et al., "Generalized syntheses of large-pore mesoporous metal oxides with semicrystalline frameworks," Nature, Nov. 1998, pp. 152-155. vol. 369.

Young, Jung Doo, International Search Report and Written Opinion, PCT/US2010/052079, Korean Intellectual Property Office, Jul. 20, 2011.

Gerwann, Jochen, Supplementary European Search Report, European Patent Office, European Patent Application No. EP 10 82 2798, Jun. 26, 2013.

Lindner, Nora, International Preliminary Report on Patentability, PCT/US2010/052079, The International Bureau of WIPO, Apr. 19, 2012.

* cited by examiner

METHODS OF MAKING METAL-OXIDES AND USES THEREOF FOR WATER TREATMENT AND ENERGY APPLICATIONS

CROSS REFERENCE TO RELATED APPLICATIONS

This application is a U.S. National Stage Application filed under 35 U.S.C. §371 and claims priority to International Application No. PCT/US2010/052079, filed Oct. 8, 2010, which claims priority under 35 U.S.C. §119 from Provisional Application Ser. No. 61/249,899, filed Oct. 8, 2009, the disclosures of which are incorporated herein by reference.

TECHNICAL FIELD

The disclosure provides relates to compositions and methods for water treatment, photovoltaics, solar hydrogen and other energy applications.

BACKGROUND

The rapid increase of technology and industry is causing new production chemicals and byproducts to be discharged into the wastewater system. These contaminants are now being found in ground and surface water, causing increased concern for the future supply of drinking water. The occurrences of emerging contaminants, which are just now being detected, with the advancement in measurement technologies, are causing increased concern for public health and safety. In order to protect the population and the environment new treatment technologies need to be developed that will not only remove these compounds but degrade them to non-harmful constituents.

In addition, world energy needs are placing higher demands on the development of inexpensive and efficient conversion technologies. Solar hydrogen production and photovoltaic applications offer potentially affordable and renewable routes to energy production.

SUMMARY

The disclosure provides a method comprising mixing a metal oxide precursor, metal sulfide precursor, metal selenide precursor, metal telluride precursor, metal nitride precursor, metal phosphide precursor, and/or metal arsenide precursor with a dispersing agent in a solvent at a desired pH under mild solution to hydrothermal conditions to promote nanomaterial-dispersing agent composite formation at a desired size and/or geometry; and calcinating the mixture at about 30-300° C. for about 1-72 hours to obtain a semiconductive partial or fully porous nanoparticle-dispersant composite. In some embodiments, the composite is further processed to remove the dispersing material by pyrolizing the composite.

Also provided are composites and nanomaterial preparations obtained by the methods of the disclosure having desired ratios of anatase and rutile as well as materials comprising anatase covalently linked to rutile.

The disclosure provides a method for the controlled synthesis of metal oxides (e.g., $TiO_2$) including size, phase, morphology and the like, and synthesis of metal oxide-organic bulk composites for various applications; water treatment, and energy conversion/production.

In one embodiment, the method uses control over Ti-precursor concentration, pH, and organic ligands that help in modification of $TiO_2$ size, phase, morphology, porosity and surface area. This process can be carried out under relatively mild conditions (e.g., temperatures between 25° C.-300° C., typically about 150° C.; pH between 0-14, depending on the Ti-precursor used; pressures of about 14-150 psi), but can be extended to more extreme conditions.

Also provided is a water treatment system comprising: a contaminated water inlet; a mixing chamber; $TiO_2$ nanoparticles; a source of UV or visible light; and a treated water outlet, wherein a contaminated water stream enter the mixing chamber through the contaminated water inlet and is mixed with the $TiO_2$ nanoparticles in the mixing chamber, exposing a solution comprising the nanoparticles and the contaminated water to an artificial or natural UV or visible light source, allowing the nanoparticles to sediment thereby removing the nanoparticles from the suspension and collecting treated water through the treated water outlet. In one embodiment, the system further comprises an acid chamber comprising an acidic solution for lowering the pH of the solution. In yet another embodiment, the system further comprises a base chamber comprising a basic solution for increasing the pH of sedimented nanoparticles. In another embodiment, the disclosure provides a method of producing bulk composite $TiO_2$-organic composite structures that can be fabricated and tailored to act as stand alone photocatalysts with high specific surface area, eliminating the need for nanoparticle recovery systems and thereby reducing processing costs.

The disclosure provides a method of treating contaminated water comprising exposing the contaminated water to a metal oxide that generates a hole in the valance band upon contact with UV or visible light wherein the hole generates OH..

The disclosure also provides methods of making and using metal oxide nanoparticles such as $TiO_2$ for photovoltaics and solar hydrogen production. In one embodiment, the metal oxide comprises other metals including, but not limited to, Ru, Ni, etc. and other metal oxides (e.g., ZnO, $Co_3O_4$, $ZrO_2$, $RuO_2$, $SnO_2$, $Al_2O_2$, etc.) and metal nitrides (e.g., AlN, BN, GaN, etc.), metal sulfides (e.g., CdS, ZnS), metal tellurides (e.g., Bi $Te_2$). Dopants that can be used include, but are not limited to, W, Ta, V, N, and S.

The disclosure provides a water treatment device comprising: a chamber having a inlet and an outlet; $TiO_2$ in the chamber; and means for exposing contaminated water in the chamber to UV or visible light. In one embodiment, the means for exposing the contaminated water to UV (or visible) light comprises a light source within the chamber or a window in a wall of the chamber that allows for transmission of UV (or visible) light external to the chamber. In yet another embodiment, the UV (or visible) light is natural or artificial. In yet a further embodiment, the $TiO_2$ comprises powder or nanoparticles. In one embodiment, the $TiO_2$ is bound to the walls of the chamber. In yet another embodiment, the $TiO_2$ is packed within the chamber between the inlet and the outlet.

The disclosure also provides a method of treating contaminated water comprising flowing contaminated water through the device in the preceding paragraph and exposing the contaminated water to UV (or visible) light while the contaminated water is in contact with the $TiO_2$.

In photovoltaic applications, the compositions of the disclosure can be used as stand alone bulk devices. In this embodiment, the bulk porous $TiO_2$ structures, for example, can be infiltrated with dye molecules (or quantum dots) as well as electrolytes or conducting polymers to afford flexible sensitized solar cells, negating the need for intensive, costly assembly (which includes growth on conducting, stiff and brittle glass). These conducting polymers that enable electron withdrawal from the $TiO_2$, could be subsequently coated with a radical scavenging material that would resist environmental degradation.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
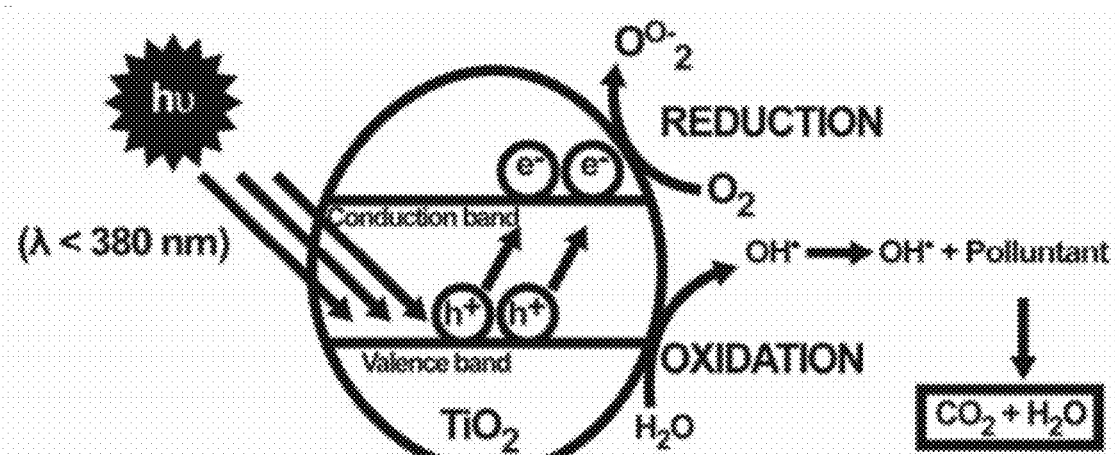
FIG. 1 illustrates the mechanism of a $TiO_2$ photocatalyst.

As used herein and in the appended claims, the singular forms "a," "and," and "the" include plural referents unless the context clearly dictates otherwise. Thus, for example, reference to "a particle" includes a plurality of such particles and reference to "the valve" includes reference to one or more valves and equivalents thereof known to those skilled in the art, and so forth.

Unless defined otherwise, all technical and scientific terms used herein have the same meaning as commonly understood to one of ordinary skill in the art to which this disclosure belongs. Although any methods and reagents similar or equivalent to those described herein can be used in the practice of the disclosed methods and compositions, the exemplary methods and materials are now described.

All publications mentioned herein are incorporated herein by reference in full for the purpose of describing and disclosing the methodologies, which are described in the publications, which might be used in connection with the description herein. The publications discussed above and throughout the text are provided solely for their disclosure prior to the filing date of the present application. Nothing herein is to be construed as an admission that the inventors are not entitled to antedate such disclosure by virtue of prior disclosure. Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

$TiO_2$ is synthesized by various methods, such as chemical vapor deposition and thermal evaporation, which require high temperatures or extreme pressures to achieve the desired phase, shape, and size of the material. Solution routes such as chemical bath deposition, sol-gel and hydrothermal routes offer more environmentally friendly and lower cost processing. However, there is a lack of control of crystal size, phase, and morphology. This synthesis process provides control over the resulting $TiO_2$ phase and crystallite size providing tunability of this semiconductor, which is imperative for optimal performance in both water treatment and energy applications.

The disclosure provides methods to generated metal oxide nanoparticles using simple processes that allow tunability of the resulting product. Although $TiO_2$ is demonstrated in the examples herein, the methodology can include other metal, metal-oxide, metal-nitride, metal-sulfide, metal arsenide, metal phosphide, and metal telluride materials including, but not limited to, Ru, Ni, ZnO, $Co_3O_4$, $ZrO_2$, $RuO_2$, $SnO_2$, $Al_2O_3$, AlN, BN, GaN, CdS, ZnS, AlAs, GaAs, InP, $Bi_2Te_3$ or any combination of inorganic compounds. Dopants may also be included in the methods to modify the band gap of a resulting product.

Nanomaterials of the disclosure can be derived from various metal precursor materials including, for example, oxides, nitrides, sulfides, tellurides, phosphide, arenides, and selenides of elements from columns 2-15 of the Periodic Table. Specific compounds that may be used as nanomaterials include, but not limited to, those set forth in Table 1 as well as aluminum cerium oxide, aluminum arsenide, aluminum nitride, aluminum oxide, aluminum titanate, antimony (III) oxide, antimony tin oxide, bismuth cobalt zinc oxide, bismuth(III) oxide, bismuth telluride, cerium(IV) oxide, cerium(IV) zirconium(IV) oxide, chromium(III) oxide, cobalt aluminum oxide, cobalt (II, III) oxide, copper aluminum oxide, copper iron oxide, copper(II) oxide, copper (I) oxide, copper zinc iron oxide, dysprosium(III) oxide, erbium (III) oxide, europium(III) oxide, gallium nitride, gallium oxide, holmium(III) oxide, indium (III) oxide, indium phosphide, indium tin oxide, iron(II, III) oxide, iron nickel oxide, iron(III) oxide, lanthanum(III) oxide, lead telluride, magnesium oxide, manganese(II) titanium oxide, nickel chromium oxide, nickel cobalt oxide, nickel(II) oxide, nickel zinc iron oxide, praseodymium(III, IV) oxide, samarium(III) oxide, silicon, germanium, strontium ferrite, tantalum oxide, terbium (III, IV) oxide, tin(IV) oxide, titanium carbonitride, titanium(IV) oxide, titanium silicon oxide, tungsten (VI) oxide, ytterbium(III) oxide, ytterbium iron oxide, yttrium (III) oxide, zinc oxide, zinc titanate, and zirconium(IV) oxide.

TABLE 1

| Types of Semiconducting Materials | Example of Semiconding Materials | Example Precursors |
|---|---|---|
| Metal-oxides | Titanium Dioxide, Zinc Oxide, Copper(I) oxide, Copper(II) oxide, Tin dioxide, Uranium dioxide | Titanium(IV) butoxide, Titanium(IV) bis(ammonium lactato)dihydroxide, Titanium(IV) bis(ammonium lactato)dihydroxide, Titanium(IV) isopropoxide, Titanium (IV) chloride, Zinc chloride, Zinc cyclohexanebutyrate, Zinc nitrate, Zinc sulfide |
| Metal-nitrides | Aluminium nitride, boron nitride, gallium nitride, indium nitride | Tris(diethylamino)gallium(III), Gallium(III) acetylacetonate, Gallium(III) tris(2,2,6,6-tetramethyl-3,5-heptanedionate) |
| Metal-sulfides | Molybdenum disulfide, Tin sulfide, bismuth sulfide, Copper zinc tin sulfide | Copper(II) acetylacetonate, Copper(II) acrylate, Copper(I) chloride, Tin(IV) tert-butoxide, Tin(IV) bis(acetylacetonate) chloride, Tin(IV) tert-butoxide |
| Metal-tellurides | Lead manganese telluride, Cadmium telluride, Zinc Telluride | Lead nitrate, zinc nitrate, Zinc(II) arene tellurolato, Cadmium nitrate, Cadmium orthophosphate, Cadmium 2,4-pentanedionate |
| Metal-phospides | Boron phospide, gallium phospide, Indium, phosphide, | Tris(diethylamino)gallium(III), Gallium(III) acetylacetonate, Gallium(III) tris(2,2,6,6-tetramethyl-3,5-heptanedionate), phosphine |
| Metal-arenides | boron arsenide, gallium arsenide, indium arsenide | Tris(diethylamino)gallium(III), Gallium(III) acetylacetonate, Gallium(III) tris(2,2,6,6-tetramethyl-3,5-heptanedionate), trimethylarsine |
| Metal-selenide | Arsenic selenide, Cadmium selenide, Ninc selenide, | trimethylarsine, Cadmium nitrate, Cadmium orthophosphate, Cadmium 2,4-pentanedionate |

As used herein, "nanoparticle" refers to a particle having dimensions that are less than 1,000 nanometers, and in particular having a size range of about 2 to about 500 nanometers. The nanoparticle can be any shape such as spheroid or cuboid. In some embodiments, the nanoparticle has a spheroidal shape.

In various embodiments, a nanomaterial is provided comprising any one or more Group 2 or 3 atoms, or transition or rare earth atoms, such as scandium, yttrium, lanthanum, actinium, or cerium or another lanthanide. In certain embodiments, the material comprises any Group 4 atom such as titanium or zirconium. In particular embodiments, the nanomaterial comprises an oxide of any Group 2, Group 3 element and/or an oxide of any Group 4 element. In general, a nanomaterial of the disclosure can comprise any combination of one or more Group 2 or 3 atoms, or rare earth atoms, and/or any Group 4 atom.

In some embodiments, the nanomaterial comprises a metal, usually in the form of a metal nanoparticle. Examples of metals include, but are not limited to, Ni, Ru, and alloys thereof. With some embodiments, the nanomaterial comprises a metal oxide such as $RuO_2$, $CuO_2$, $ZrO_2$, $TiO_2$, $Al_2O_3$, $CeO_2$, $Nb_2O_5$ or $MnO_2$. In particular embodiments, the metal or metal oxide is a metal catalyst such as Au, Pd, Pt, Ru or $RuO_2$.

The compositions of the disclosure can comprise homogenous nanoparticles, mixtures of two or more different metal nanoparticles (e.g., a heterogeneous mixture) and/or may comprise nanoparticles wherein two or more metals are present in a single nanoparticle, for example, in the form of an alloy or a mixture of these metals. Non-limiting examples of alloys include Ag/Au, Ag/Ni, Ag/Cu, Pt/Cu, Ru/Pt, Au/Pt and Ag/Co.

The disclosure also provides a method to generate a nanomaterial composition of the disclosure comprising Group 2, group 2 and Group 3 or Group 3 and Group 4 metals, metal-oxides, metal-sulfides, metal-arenides, metal-phospides, metal-tellurides and metal-nitrides, and in particular titanium oxide nanomaterials. This method allows for a number of parameters to be tuned independently such as, for example, the size, shape, porosity and/or composite composition.

The disclosure also provides a method for the formation of nanomaterials comprising a Group 2, Group 2 and Group 3, Group 3 or Group 3 and Group 4 oxides. In one embodiment, the disclosure provides a method of making a titanium oxide nanomaterial. The nanomaterial can be tuned in diameter from about 1-30 nm. These nanomaterial are therefore highly stable with a high degree of material tunability.

Generally, the method of the disclosure comprises mixing a precursor material with a dispersing agent under mild conditions in a desirable pH and allowing the reaction to proceed at room temperature or under mild heat conditions to from a composite having semiconductive nanoparticles dispersed in a matrix of dispersing agent.

Dispersing agents useful in the disclosure comprise materials that serves to control growth by controlling diffusion of ions, serve to modify or control the shape of a nanoparticle and/or promotes cross-linking between metal particles to form a composite material. Numerous dispersing agents are known in the art. Such dispersing agents include various polymers. For example, dispersing agents that comprises one or more heteroatoms which are available for hydrogen bonding, ionic interactions, etc. (such as, e.g., O and N) can be used.

Various dispersing agents are used in the methods of the disclosure. For example, a metal oxide precursor can be dispersed in a dispersing agents selected from the group consisting of general carbon-backbone based polymers with pendant groups including, but not limited to hydroxyls, carboxylates, phosphates, sulfates, amines. In addition, polymers such as the following can be used: phosphoglycerides; dioleylphosphatidyl ethanolamine (DOPE); dioleyloxypropyltriethylammonium (DOTMA); cholesterol; cholesterol ester; diacylglycerol; diacylglycerolsuccinate; diphosphatidyl glycerol (DPPG); hexanedecanol; fatty alcohols such as polyethylene glycol (PEG); polyoxyethylene-9-lauryl ether; a surface active fatty acid, such as palmitic acid or oleic acid; fatty acids; fatty acid amides; sorbitan trioleate (Span 85); polysorbate 80 (TWEEN-80); sodium cholate methyl cellulose; gelatin; surfactin; a poloxomer; a sorbitan fatty acid ester such as sorbitan trioleate; phosphatidylserine; phosphatidylinositol; phosphatidylethanolamine (cephalin); cardiolipin; phosphatidic acid; dicetylphosphate;

dipalmitoylphosphatudylglycerol; stearylamine; dodecylamine; hexadecylamine; acetyl palmitate; glycerol ricinoleate; hexadecyl sterate; isopropyl myristate; tyloxapol; polyethylene glycol) 5000-phosphatidylethanolamine; polyvinyl alcohol (PVA); phospholipids; poloxamers, Poly (vinylphosphonic acid), Poly(acrylic acid), Poly(vinylsulfonic acid), Poly(methacrylic acid), poly (phosphonic acid) or any combinations thereof. In one embodiment, titanium bis ammonium lactato dihydroxide (TiBALDH) is dispersed in a neutral or protic solvent comprising PVA.

Any suitable method and device and combinations thereof can be used for calcination, e.g., heating in a furnace or on a hot plate, irradiation with a light source (UV or visible lamp, IR or heat lamp, laser, etc.), an autoclave, combinations of any of these methods, to name just a few. Also, one or more of these steps may optionally be carried out in a reducing atmosphere (e.g., in an $H_2/N_2$ atmosphere for metals that are prone to undergo oxidation, especially at elevated temperature, such as e.g., Ni) or in an oxidizing atmosphere.

Various solvents can be used in the methods of the disclosure. The selection of solvent will depend upon and can be empirically determined by one of skill in the art. Selection will depend upon the type of precursor compound used in the formation of a semi-conductive nanoparticle. In some embodiments, it is advantageous for the solvent for mixing the dispersing agent and precursor material comprise one or more polar solvents and, in particular, protic solvents. For example, the vehicle may comprise a mixture of at least two protic solvents, or at least three protic solvents. Non-limiting examples of such protic solvents include alcohols (e.g., aliphatic and cycloaliphatic alcohols having from 1 to about 12 carbon atoms such as, e.g., methanol, ethanol, n-propanol, isopropanol, 1-butanol, 2-butanol, sec-butanol, tert-butanol, the pentanols, the hexanols, the octanols, the decanols, the dodecanols, cyclopentanol, cyclohexanol, and the like), polyols (e.g., alkanepolyols having from 2 to about 12 carbon atoms and from 2 to about 4 hydroxy groups such as, e.g., ethylene glycol, propylene glycol, butylene glycol, 1,3-propanediol; 1,3-butanediol, 1,4-butanediol, 2-methyl-2,4-pentanediol, glycerol, trimethylolpropane, pentaerythritol, and the like), polyalkylene glycols (e.g., polyalkylene glycols comprising from about 2 to about 5 $C_{2-4}$ alkylene glycol units such as, e.g., diethylene glycol, triethylene glycol, tetraethylene glycol, dipropylene gycol, tripropylene glycol and the like) and partial ethers and esters of polyols and polyalkylene glycols (e.g., mono($C_{1-6}$ alkyl)ethers and monoesters of the polyols and polyalkylene glycols with $C_{1-6}$ alkanecarboxylic acids, such as, e.g., ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether and diethylene glycol monobutyl ether (DEGBE), ethylene gycol monoacetate, diethylene glycol monoacetate, and the like).

Any aprotic organic solvent can be used in the methods of the disclosure. These aprotic organic solvents may include solvents such as dioxane, dimethylformamide, dimethylacetamide, sulfolane, N-methylpyrrolidine, dimethylsulfone, dichloroethane, trichloroethane, and freons, or solvents such as dichloromethane, acetonitrile, and tetrahydrofuran.

In an aprotic solvent environment, oxide surfaces have a common feature, namely abundant permanent dipoles on their surface, which means that they adsorb charged, polar, and highly polarizable species, such as metal nanoparticles, through dipole-charge, dipole-dipole, and dipole-induced dipole interactions, respectively.

In view of the interaction between the solvent and the dispersing agent, the most advantageous solvent is in one aspect a function of the nature of the dispersing agent. For example, a dispersing agent that comprises one or more polar groups such will advantageously be combined with a vehicle which comprises (or predominantly consists of) one or more polar components (solvents) such as, e.g., a protic solvent, whereas a dispersing agent that substantially lacks polar groups will typically be combined with a vehicle which comprises, at least predominantly, aprotic, non-polar components.

The ratio of precursor and dispersing agent can vary over a wide range (see, e.g., Table 2). The ratio depends on factors such as the nature of the dispersing agent (polymer, molecular weight, etc.).

TABLE 2

| PVA:Ti | Molecular Weight (optimal) | Other MW |
| --- | --- | --- |
| 1:1 | 9,500 | 40,500; 150,000 |
| 1:10 | 9,500 | 40,500; 150,000 |
| 1:100 | 40,500 | 9,500; 150,000 |
| 1:1,000 | 40,500 | 9,500; 150,000 |
| 1:10,000 | 40,500 | 9,500; 150,000 |
| 1:100,000 | 40,500 | 9,500; 150,000 |

Using embodiments of the disclosure nanomaterial composites comprising a semi-conductive nanoparticle dispersed in a polymerized dispersing agent are obtained. The composite material may be partially (e.g. 0.1-99%), substantially or fully pyrolyzed to remove the dispersant and leave only the nanoparticles by heating between 300° C. to 1000° C. The composite and nanoparticles obtained by the methods of the disclosure comprise anatase particles covalently linked to rutile particles.

For example, to generate the desired nanoparticles, laser pyrolysis is used either alone or in combination with additional processing. Specifically, laser pyrolysis is an process for efficiently producing suitable semi-conductive particles with a narrow distribution of average particle diameters. Other methods of pyrolysis are known in the art and can be used in the methods described herein.

Figure 9:
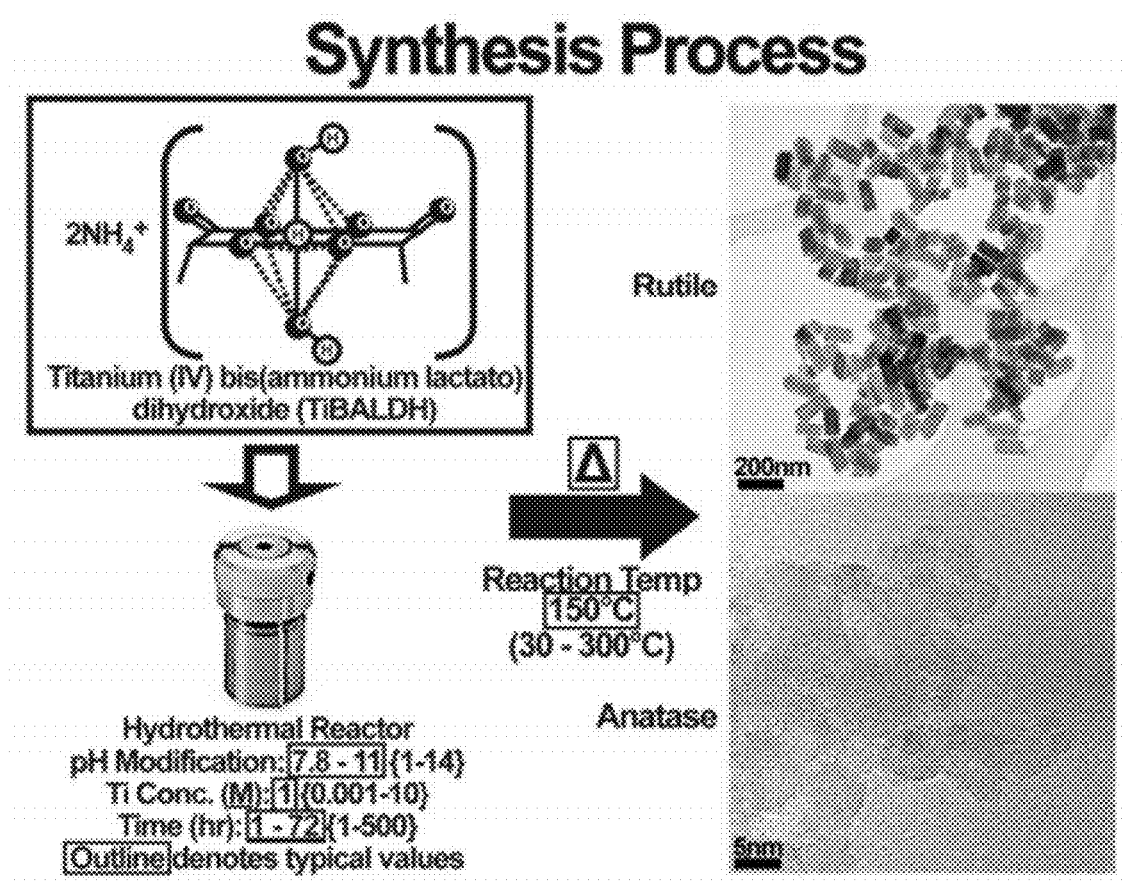
FIG. 9 shows a diagram of a synthesis process for TiO2 nanomaterials of the disclosure.
Figure 10:
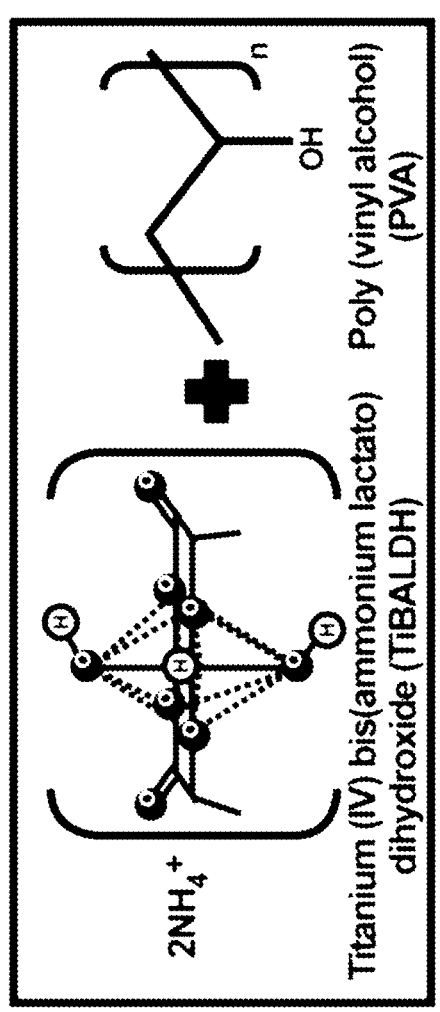
FIG. 10 shows a diagram of a synthesis for TiO2 polymer composites of the disclosure.
Figure 10:
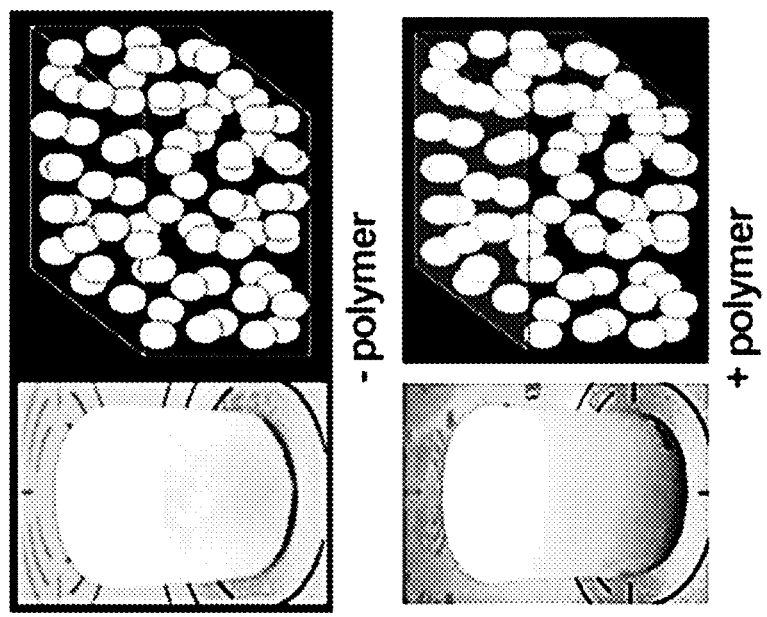
Figure 11:
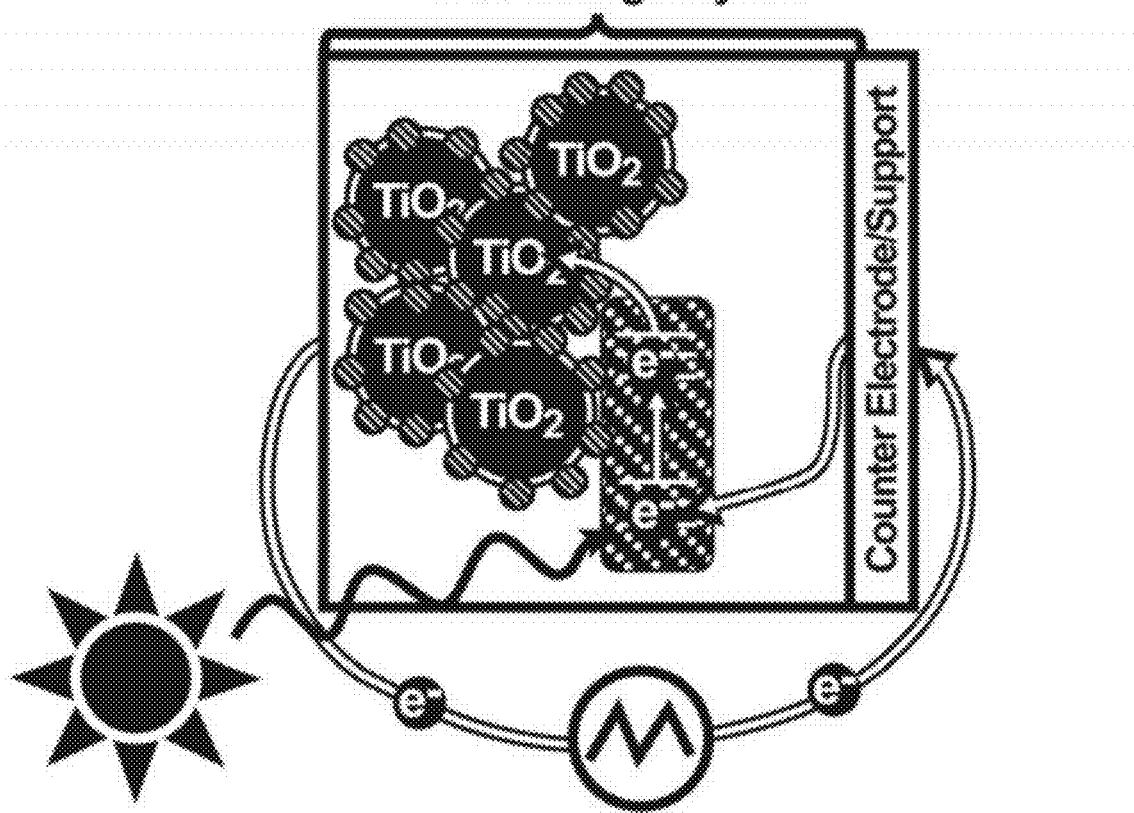
FIG. 11 shows a schematic of a sensitized (dye or quantum dot) solar cell using a conductive polymer.

A process for the fabrication of $TiO_2$ nanomaterials according to one embodiment is outlined in FIGS. 9 and 10. As shown in FIG. 9, a titanium oxide precursor is reacted with $2NH_4^+$ at a typical pH of 7.8-11 (although a pH of 1-14 is usable) for 1-72 hours at 150° C. The titanium oxide precursor material is dispersed in an aqueous solution by stirring or sonication and then loaded into a Teflon-lined stainless steel autoclave vessel and heated to about 150° C. for about 1 to about 72 hours to nucleate and grow $TiO_2$ nanoparticles through hydrolysis and condensation.

In FIG. 10, a method of generating tunable metal oxides-organic composite is depicted. As shown in FIG. 10, soluble Ti precursor (Titanium bis ammonium lactato dihydroxide (TiBALDH, 50 wt %)) are reacted under conditions for the desired growth of titanium dioxide ($TiO_2$) nanoparticles through the addition of a polymer, polyvinyl alcohol (PVA; MW ~41500), under mild temperatures (150° C.) and neutral pH within a sealed reaction vessels. The pH can be adjusted using ammonium hydroxide. The reactor is then sealed and heated to a temperature of greater than about 100° C. (e.g., about 150° C.) for 1-72 hours (e.g., 12 to 72 hours) to nucleate and grow $TiO_2$ nanoparticles through hydrolysis and condensation. Various extremes of the temperature and length of reaction can be used. For example, the lower the temperature the longer the reaction time. Accordingly, a temperature range of about 25-300° C. can be used and the reaction period can be from several hours to several months depending upon the temperature. The reaction produces metal oxide-polymer composite consisting of crystalline $TiO_2$ nanoparticles that are tuned to the desired size, specific surface area, and phase ratios (anatase:rutile) that is needed for a specific applications (e.g., photocatalytic reactions, photovoltaic cells and the like). For example, the concentration of the polymer or dispersing agent can also be adjusted with more polymer or dispersing agent increasing the porosity of the final product to very little polymer resulting in a powder instead of the bulk $TiO_2$-organic composite. Alternative MW PVA polymers can be used as well as other functionalized polymers (e.g., polyaspartic acid). This fabrication of a composite $TiO_2$-organic material is advantageous as it can be fabricated and tailored to act as stand alone photocatalysts, eliminating the need for nanoparticle recovery systems, thereby reducing processing costs.

After the reaction, the product is removed from the reactor and can be washed in water to remove by-products and unreacted precursors and then dried using critical point drying or drying oven. The pH does not have to be modified, although increasing the pH to 9 or greater increases the rate of hydrolysis of the titanium precursor thereby controlling the resulting phase and crystallite size. The reaction temperature is not critical although a minimum of 50° C. should be used to enable hydrolysis and condensation of the TiBALDH precursor. The concentration of the polymer can also be adjusted with more polymer to increase the porosity of the final product or to very little polymer resulting in a powder instead of the bulk composite. The reactor can be scaled to smaller or larger volumes, only limited by the cost to manufacture these reactors. It also may be possible to carry out these reactions in non-sealed reactors equipped with condensers to minimize evaporation and if the proper chemistry (e.g., pH, temperature) and time will afford the necessary hydrolysis and condensation reactions of the TiBALDH. In addition to organic additives to the synthesis process dopants can be added to reduce the band gap thereby increasing the efficiency of the material when employing solar light instead of UV-light. These reactions are not limited to $TiO_2$ and can be modified with metal nanoparticles (Au, Pd, Pt, Ru, Ni, etc.), metal oxide nanoparticles (ZnO, $Co_2O_4$, $ZrO_2$, $RuO_2$, $SnO_2$, $Al_2O_3$), metal nitrides (AlN, BN, GaN), metal sulfides (CdS, ZnS), metal arsenides (GaAs), metal phosphides (InP), or any combination of inorganic compounds. Dopants including, but not limited to, W, Ta, V, N, and S can be added to modify the band gap. The solvent does not have to be water. Non-aqueous based solvents (e.g., alcohols, ethers, etc.) can be utilized to synthesize materials that would otherwise not form under aqueous conditions. In addition, the polymer can be modified to one that cross-links metals, metal nitrides, metal carbides, etc. The polymer can also be modified to be electrically conducting, allowing the production of electronic and optoelectronic devices.

Furthermore, various metal oxide precursors can be used in the methods including those selected from the group consisting of aluminum bis-ethylacetoacetate monoacetylacetonate, aluminum diacetylacetonate ethyl acetoacetate, aluminum monoacetylacetonate bis-propyl acetoacetate, aluminum monoacetylacetonate bisbutyl acetoacetate, aluminum monoacetylacetonate bishexyl acetoacetate, aluminum monoethyl acetoacetate bispropyl acetoacetate, aluminum monoethyl acetoacetate bisbutyl acetoacetonate, aluminum monoethylacetoacetate bis-hexyl acetoacetonate, aluminum monoethylacetoacetate bisnonylacetoacetonate, aluminum dibutoxide monoacetoacetate, aluminum dipropoxide monoacetoacetate, aluminum butoxide monoethylacetoacetate, aluminum-s-butoxide bis(ethyl acetoacetate), aluminum di-s-butoxide ethylacetoacetate, aluminum-9-octadecenyl acetoacetate diisopropoxide, titanium allylacetoacetate triisopropoxide, titanium di-n-butoxide (bis-2,4-pentanedionate), titanium diisopropoxide (bis-2,4-pentanedionate), titanium diisopropoxide bis(tetramethylheptanedionate), titanium diisopropoxide bis(ethyl acetoacetate), titanium methacryloxyethylacetoacetate triisopropoxide, titanium oxide bis(pentanedionate), titanium salts such as titanium chloride, titanium sulfate; titanium butoxide, titanium bis lactato dihydroxide, zirconium allylacetoacetate triisopropoxide, zirconium di-n-butoxide (bis-2,4-pentanedionate), zirconium diisopropoxide (bis-2,4-pentanedionate), zirconium diisopropoxide bis(tetramethylheptanedionate), zirconium diisopropoxide bis(ethylacetoacetate), zirconium methacryl icoxyethylacetoacetate triisopropoxide, zirconium butoxide (acetylacetate) (bisethylacetoacetate), and iron acetylacetonate. The precursor ligands can be tuned to provide control of hydrolysis reactions in this process.

The resulting material is advantageous for photocatalytic, photovoltaic and solar hydrogen applications because the $TiO_2$ phase, crystallite size, porosity, and surface area are easily tunable using synthesis parameters to optimize for the appropriate application. This composite photocatalyst is also advantageous because the material maintains a high surface to maximize efficiency while being a bulk composite that is easily retained or recovered from the effluent stream.

For example, the compositions find use in water purification. Increasing sensitivity of current measurement techniques has led to the identification of new contaminants that were previously below the detection limit for drinking water and wastewater. Pharmaceuticals and personal care products (PPCPs), surfactants, and various industrial chemicals are known to be endocrine disrupting compounds (EDCs) and are currently not removed by typical wastewater treatment practices. A large issue to be addressed is the lack of regulations for these new emerging contaminants that are outpacing the measurement techniques to detect them. Currently the Food and Drug Administration (FDA) does not require testing when the concentration of such compound is below 1 μg/L. With the increase of industry, the spectrum of these compounds is continuing to expand along with their unknown potential health risks.

Figure 3:
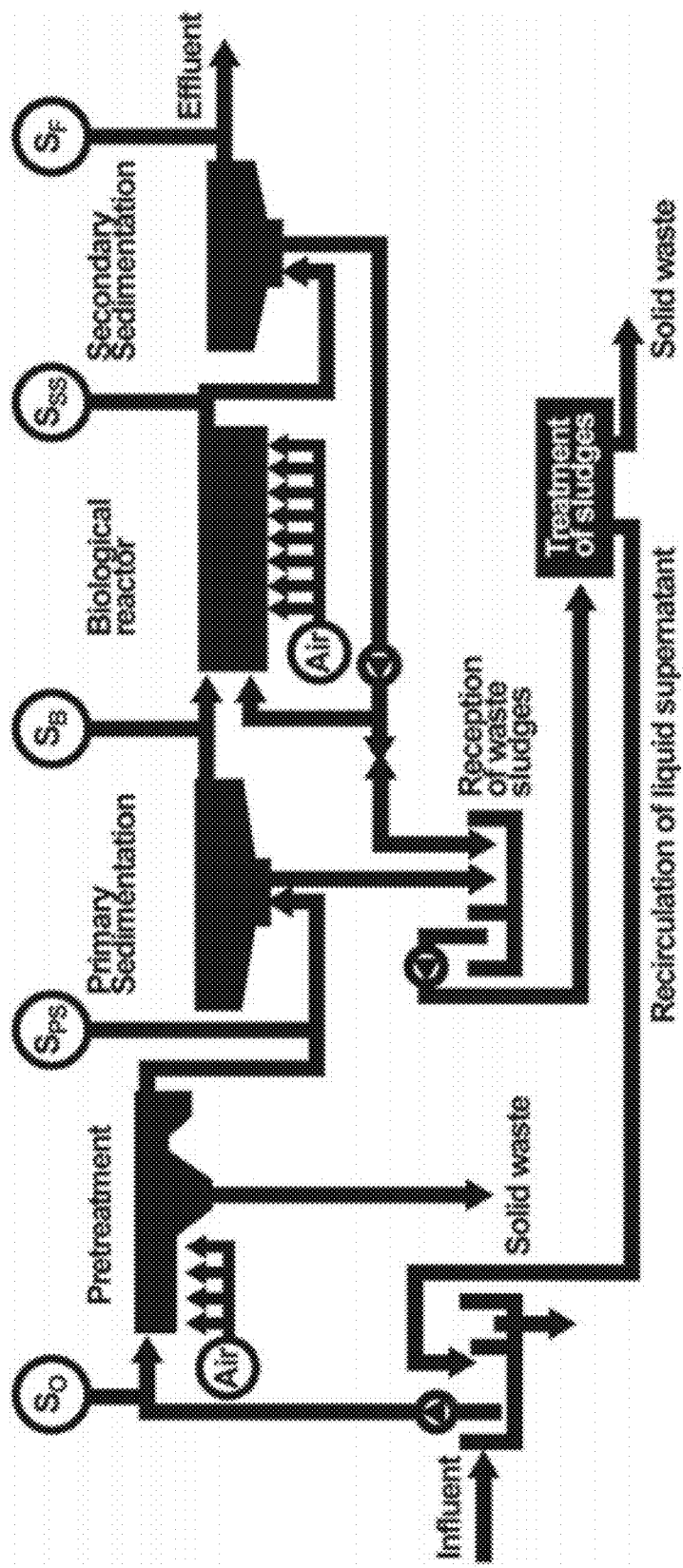
FIG. 3 depicts an example diagram of a municipal sewage treatment plant.
Figure 4:
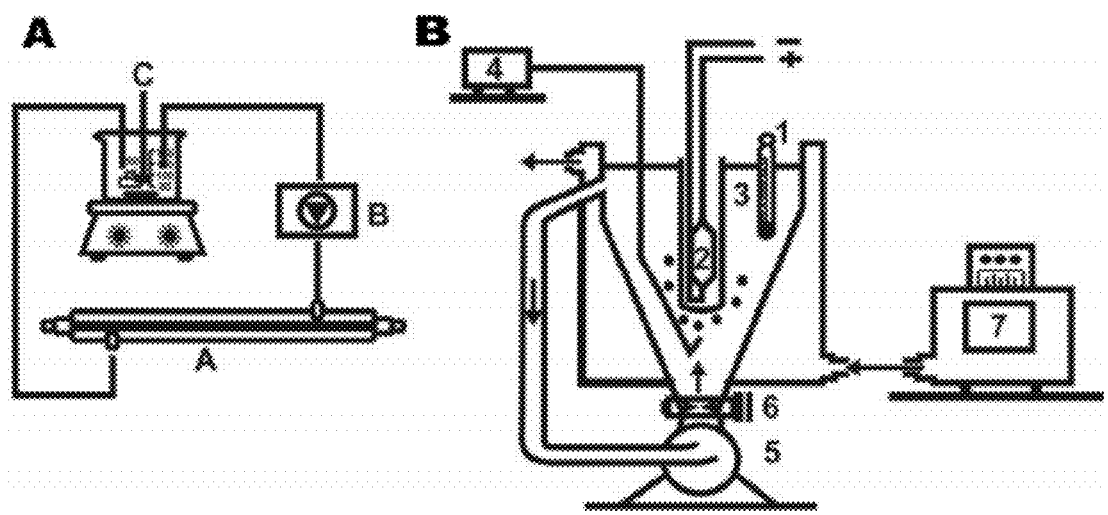
FIG. 4A-B show A) Batch Annular photoreactor tube with UV or visible light source in center of the tube with a suspension flowing through it. B) Batch annular and symmetric vertical reactor with a conic body shape; the suspension is recirculated upwards through the reactor.
Figure 5:
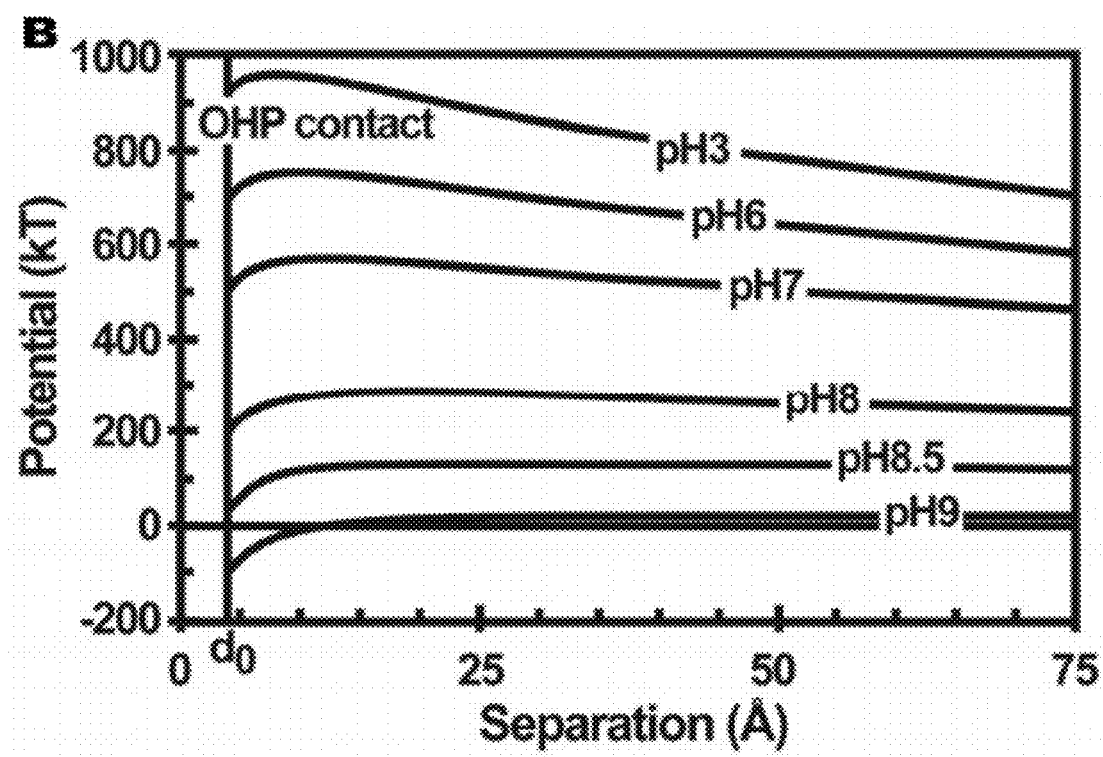
FIG. 5 shows Potential of interaction between particles versus pH, with constant charge boundary conditions. Calculation based on Hamaker constant A=9 kBT, ionic strength=$5\times10^{-5}$ M.
Figure 6:
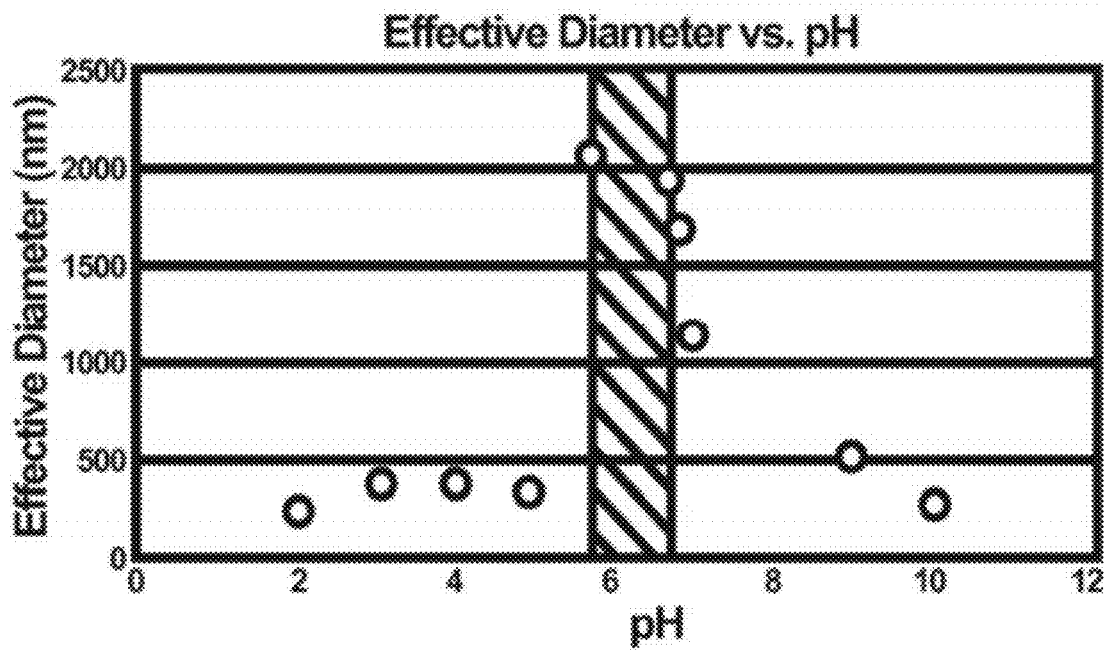
FIG. 6 shows the effect of pH on the effective diameter of Degussa P25 $TiO_2$ powder.

Existing water and wastewater treatment facilities are well designed for the removal of contaminants that are specified in existing regulations. FIG. 3 below is an example diagram for a wastewater treatment system where the influent is treated by a series of stages: pretreatment, primary sedimentation, biological reactor, secondary sedimentation. The pretreatment may involve coarse and fine screening to remove large matter in the liquid stream and aeration chambers to remove grit and fat. Following the pretreatment is the primary sedimentation stage where the suspended particles are removed potentially by flocculation and coagulation compounds to aid in sedimentation. The biological reactor breaks down the biodegradable compounds in the water using activated sludge processes. The secondary sedimentation removes the activated sludge from the water stream following the bioreactor and the supernatant is the effluent from the wastewater treatment plant. In addition to the flow diagram seen in FIG. 3 chlorine or some disinfecting agent may be added to the effluent stream after leaving the secondary sedimentation. The treatment plant processes and design are dependent on the source water and detectable contaminants in the water.

Within the wastewater treatment system or even within a drinking water treatment system various options are available for the pretreatment materials and processes depending on the source water and contaminants. Table 3 outlines some common treatment processes and their removal efficiency for EDC's. Powder Activated Carbon (PAC), Chlorination, and Ozonation have the highest removal efficiency. However PAC only adsorbs the compounds but does not degrade the compounds, instead it just transfers the contamination to a new phase. Chlorination is a common disinfectant and oxidizes the contaminants but produces chlorine by-products that are just as dangerous if not more so.

TABLE 3

Removal performance of EDCs by treatment processes

| Treatment process | Removal performance |
| --- | --- |
| Coagulation by alum or ferric sulphate | <20% of compound removed, specially associated with particulate matter<br>Presence of hydrophobic dissolved organic carbon enhances removal and provides partitioning |
| Lime softening | <20% of compound concentration was removed at pH 9~11 |
| Powder activated carbon (PAC) | >90% of many EDCs removed (at 5 mg/L dose PAC of 4 hour contact time)<br>Yet some EDCs (ibuprofen, sulfamethoxazole, meprobamate) had lower removals (40-60%)<br>Hydrophobic compounds (octanol-water partition co-efficient, log $K_{ow}$ > 5) have better removal than polar compounds |
| Biofilm | Removal depends on biodegradability of compounds but removal rate is unclear |
| Chlorination | Able to remove >90% for more reactive compounds containing aromatic structures with hydroxide functional groups<br>Not suitable because it produces chlorine by-product (react with EDCs) and should be avoided |
| Ozonation | Oxidized similar to chlorination but at slightly higher removal rates<br>Addition of hydrogen peroxide during ozone addition slightly increased the EDCs removal |

Figure 12:
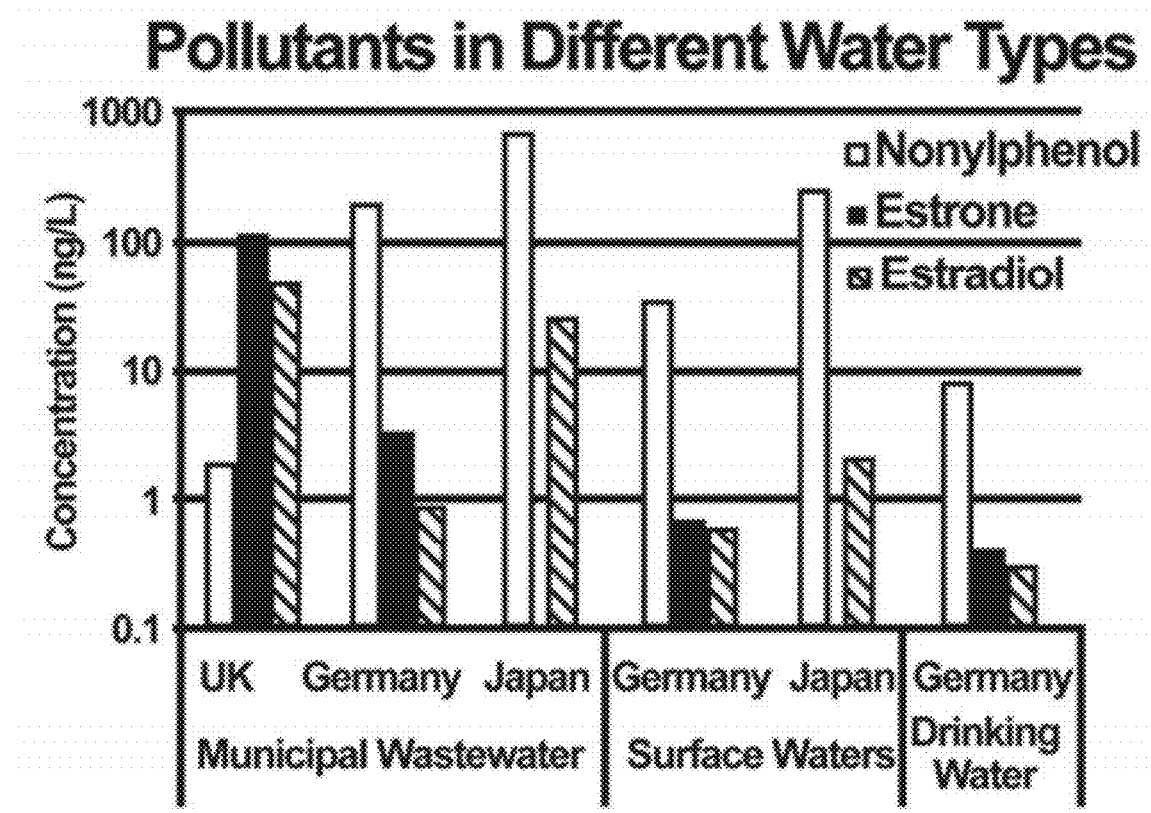
FIG. 12 EDCs found in different water samples.

According to Bolong et al., EDCs occur in drinking water sources on the order of μg/L to ηg/L (illustrated in FIG. 12) which indicates that current wastewater treatment technologies are not adequately removing these compounds as illustrated by Table 3.

To accommodate the ever increasing demand for clean drinkable water and the alarming increase in the use of personal care products and pharmaceuticals (PCPPs), new treatment methods other than the traditional processes discussed above must be implemented to remove these hazardous compounds. A new potential treatment technology is utilizing the oxidizing potential of the hydroxyl radical (OH.) which will react with most organic compounds and does not require the amount of capital investment as in the process of reverse osmosis. Additionally OH. causes the degradation of a wide range of compounds to complete mineralization with no selectivity. Table 4, developed by the Environmental Protection Agency, shows a sampling of more than 800 molecules that have been inventoried and classified that can be completely mineralized by OH.. Complete mineralization of the pollutant eliminates the concern of secondary byproducts that are formed when using other oxidation agents such as chlorine. There are many methods to produce OH. with the aid of ultra-violet radiation (UV) such as $H_2O_2$/UV, $O_3$/UV, $H_2O_2/O_3$/UV, $TiO_2$/UV, etc. While all of these processes produce OH. when coupled with UV, $TiO_2$ has the distinct advantage of being a heterogeneous catalyst, which is easily integrated into existing treatment systems and can be isolated from the effluent liquid stream.

TABLE 4

Classified molecules that are degrade by photocatalyst

| Utilization | Products |
| --- | --- |
| Chlorinated solvents | Chloroform, carbon tetrachloride, trichloroethylene, chlorobenzene . . . |
| Non-chlorinated solvents | Acetone, acetonitrile, benzene, cyclohexane, formaldehyde, phenol, methylbenzene . . . |
| Insecticides | Aldrin, dichlorvos, lindane, parathion, monocrotophos . . . |
| Pesticides | Atrazine, monuron . . . |
| Dyes | Acid orange 7, green malachite, naphtol blue black . . . |
| Detergent | Octoxynol (triton X-100) . . . |

Figure 2:
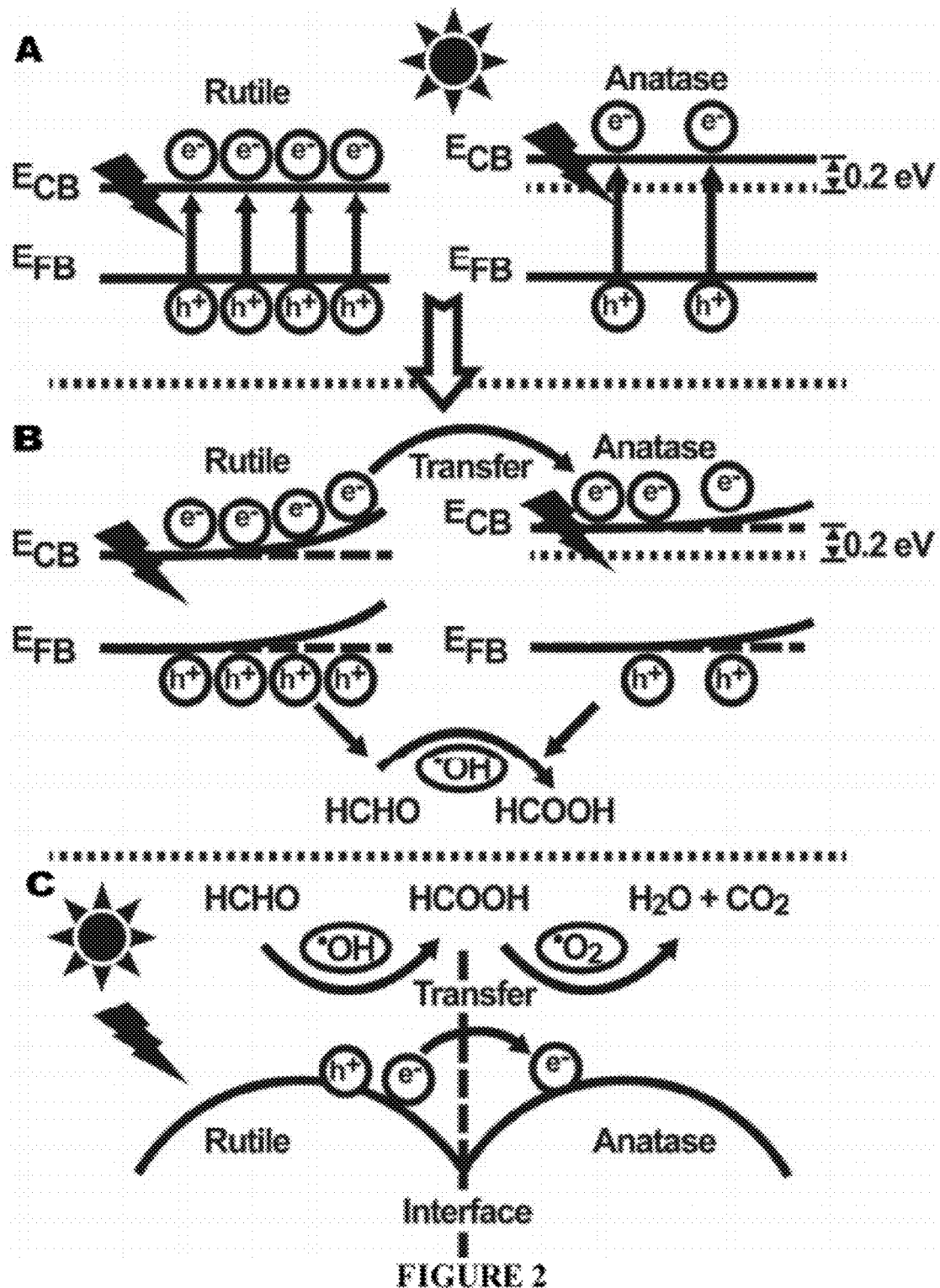
FIG. 2A-C shows a schematic of electron transfer between rutile and anatase $TiO_2$ particles resulting in a photocatalytic reaction.

FIGS. 1 and 2 illustrate the general mechanism of a $TiO_2$ photocatalyst. $TiO_2$ is a semiconductor therefore it contains a conduction band that has an energy gap small enough that electrons in the valence band can be excited to the conduction band. Only the UV portion of the spectrum has energy (hu) greater than the band gap to excite a valence electron into the conduction band of the semiconductor. This leaves a hole ($h^+$) in the valance band of the $TiO_2$ that will oxidize the water in the solution to the OH.. The hole can also perform as the oxidizing agent as well by oxidizing the contaminant directly bypassing the OH. step.

In addition to the general mechanisms mixed phase $TiO_2$ such as Degussa P25 has been shown to perform better than pure anatase or rutile phase $TiO_2$ particles as photocatalyst. The improved performance of the anatase and rutile mixed phase photocatalysts is attributed to a synergistic effect. The rutile phase has a slightly lower band gap energy than the anatase phase which increases the probability to promote electrons to the conduction band in the rutile particle. In the presence of anatase the excited electron of the rutile particle can be transferred to the anatase particle, which will inhibit the electron-hole recombination. The mechanism of the electron transfer between the different particles (anatase and rutile) is not clearly understood but it is clear that the presence of both phases greatly improves the photocatalytic activity. The optimum ratio of anatase to rutile particles is also debatable because the ratio is dependent on the synthesis process, resulting particles sizes, and the needed application. FIG. 2a shows the difference in the band gap energies of rutile and anatase particles resulting in a greater number electron-hole pairs created in the rutile particle than the anatase. FIG. 2b demonstrates one theory as to how the electrons transfer from the rutile to the anatase particle due to the conduction band bending from the increased number for excited electrons. Since an electron transferred from the rutile to the anatase particle, there is one less electron than holes which decreases the odds for electron-hole recombination. In addition to increasing the efficiency of producing OH. the mixed phase $TiO_2$ increases the efficiency of the direct oxidation of the organic molecule as shown in FIG. 2c.

Figure 8:
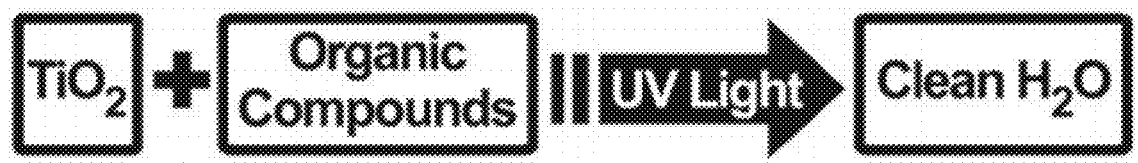
FIG. 8 shows a general overall process for water decontamination of the disclosure.

The disclosure provides methods and systems for water treatment using metal oxides semiconductors (e.g., $TiO_2$) that are capable of generating a hole in the valance band suitable for oxidizing the water to OH.. The method comprises adding in a water treatment system a metal oxide semiconductive material such as $TiO_2$ to an aqueous solution comprising contaminants and exposing the solution to a suitable wavelength (e.g., visible to UV, about 300-700 nm, more typically about 325 nm) (see, FIG. 8). Although various embodiments in the Figures and described herein refer to flow-through systems, batch systems are also useful.

One viable method for large scale application is immobilizing the $TiO_2$ on a substrate and designing a flow-through reactor to accommodate the contaminant loading. This process design allows for the catalyst to easily be separated from the effluent liquid stream. A packed bed style reactor system for photocatalyst can utilize sun-light or employ artificial lighting thereby enhancing the efficiency since less than 5% of the sunlight is UV light (see, e.g., FIG. 7B).

Figure 7A:
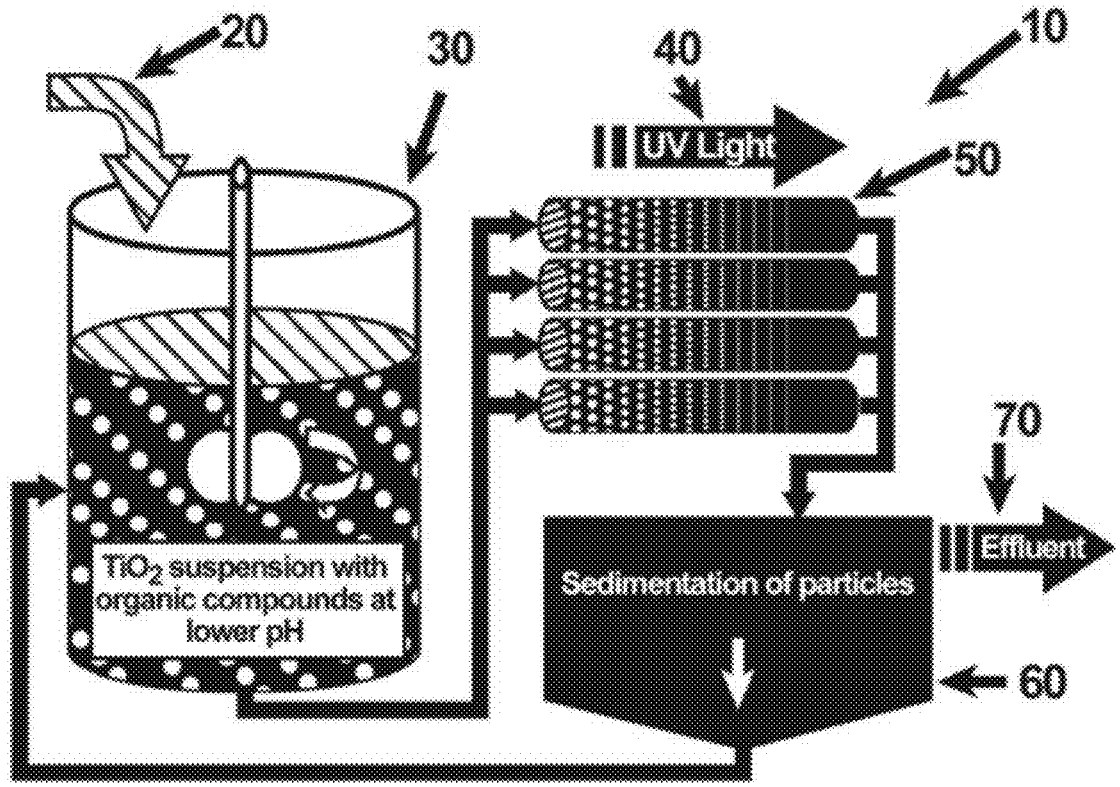
FIG. 7A-C show various schematic of nanoparticle implementation for a water or wastewater treatment plant.

Turning to FIG. 7A there is shown an embodiment comprising a water treatment system (10). The system 10 comprises an inlet 20 for delivery of waste water, a reservoir 30 for mixing waste water with a metal oxide (e.g., $TiO_2$) and a treatment region 50 comprising a light system 40 (e.g., UV light) for generating reactive OH. radicals. The system further includes a sedimentation reservoir 60 for collecting the nanoparticles and an effluent 70 for siphoning off treated water. For large scale applications, the degradation of the organic compounds cannot operate as a batch reactor as the lab scale systems were designed for testing. Additionally the nanoparticles cannot be simply discharged into either a natural environment or the water distribution system. The particles need to be easily removed from the liquid stream after the photocatalytic reactor then the particles can be recycled back into the reactor system. FIG. 7 depicts an illustration of the integration of nanoparticles for the treatment of water. First the liquid stream from the treatment plant is mixed with the $TiO_2$ nanoparticles. The suspension then flows though the photocatalytic reactor where it is irradiated with an artificial or natural UV or visible light source. The suspension is transferred into a sedimentation basin to remove the nanoparticles from the suspension similar to processes used in traditional water treatment.

By increasing the available active sites on the titania, the photocatalytic properties of the catalyst will improve. It has been shown that powders improve the efficiencies by increasing the surface area to volume ratio, which minimizes the amount of material not exposed to the excitation source and reaction environment. The next step past using powders is using nanoparticles, which can increase the surface area by a factor of six.

When using nanoparticles, the stability of the particles in solution should be considered. To ensure that the maximum surface area is utilized, the water should be maintained at a pH of about 0-5.5 or 7-14, however the full range of pH (0-14) can be used with less effective results. Typically the pH is lower than 6.4, which is the approximate isoelectric point of Degussa P25. By lowering the pH, the particles will acquire a net positive charge thereby repelling each other due to the electrostatic repulsion. Additionally $TiO_2$ photocatalysts are reported to have higher efficiencies at a lower pH potentially due to the particle's stability, which increases the number of active sites. However since the entire mechanism is not fully understood the lower pH may also improve the surface chemistry. According to DVLO (Derjaguin and Landau, Verwey and Overbeek) theory the primary energy barrier must be greater than $15k_BT$ to greatly decrease the occurrence of aggregation (where $k_B$ is the Boltsmann constant and T is temperature). This energy barrier corresponds to approximately ±0.5 pH units of the isoelectric point. Thereby ensuring that the nanoparticles remain suspended within the solution the pH can be modified to below pH 5. Decreasing the pH further will decrease the degree of aggregation however extremely low pH will decrease the effectiveness of the catalyst as previously discussed.

Since the $TiO_2$ nanoparticles are catalysts they are not used up during the reaction and can be reused. As previously discussed, the particles can be separated, however, in certain embodiments the particles are in large aggregates, which greatly diminish the degradation efficiency. The DLVO theory does not predict the redispersion of the particles caused by the continued increase of pH. However, the particles will begin to redisperse due to the increasing electrostatic repulsion (assuming a moderate ion strength that remains constant). By rapidly mixing the large aggregates into a low pH solution the aggregates will break up due to the electrostatic repulsion and the shear force of mixing. To be sure that the particles are thoroughly dispersed before entering the photocatalytic reactor, rapid mixing or sonication can be used in addition to mixing the $TiO_2$ nanoparticles in lowered pH.

The disadvantage of using nanoparticles is the difficulty in separating the catalyst from the "clean" effluent so it remains behind in the reactor (i.e. packed bed reactor with the catalyst on a support) or to recycle it back into the system (slurry reactor where the catalyst is not on a support). Removal of the catalyst by filtration would require a filter on the order of 10 nm, which would require the capital cost similar to reverse osmosis and nanofiltration.

Figure 7B:
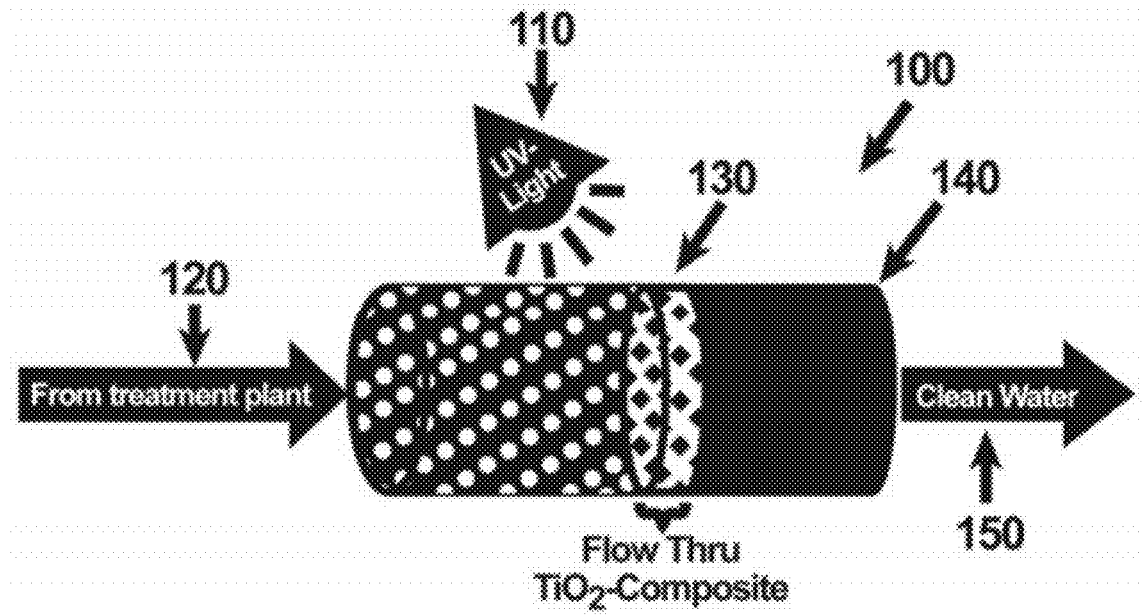

Turning to FIG. 7B there is shown an embodiment comprising a water treatment system (100). The system 100 comprises a plug flow style system having a treatment reactor 140 comprising an inlet 120, a flow-through metal oxide bed 130, a light source 110 and an outlet 150. During operation waste water enters the treatment reactor 140 through inlet 120. As the waste water is passed through the metal-oxide bed a light source 110 activates the metal-oxide bed to form OH.. The OH. react with contaminants in the waste water. The treated water is then collected through outlet 150.

Figure 7C:
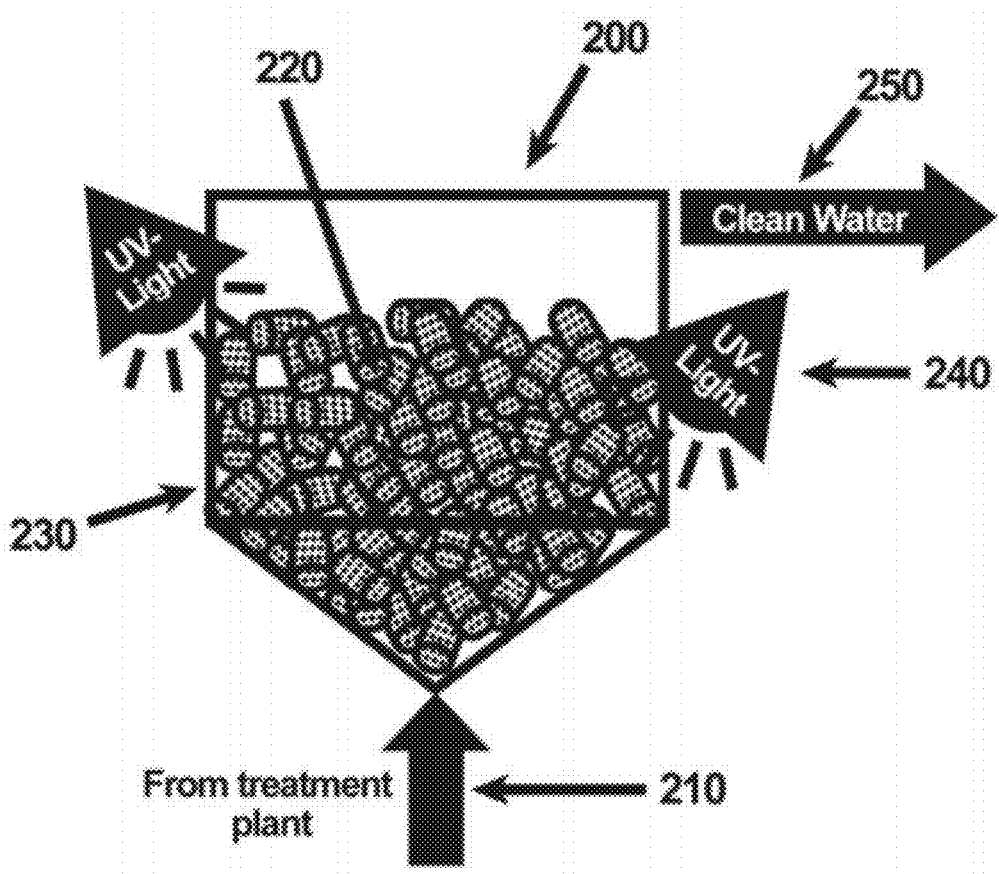

Turning to FIG. 7C there is shown an embodiment comprising a water treatment system (200). The system 200 comprises a treatment reservoir 230 comprising an inlet 210, a metal oxide sediment 220, a light source 240 and an outlet 250. During operation waste water enters the treatment reservoir 230 through inlet 210. The waste water passes through gravity sedimented metal oxide 220. As the waste water is passed through the metal-oxide sediment 220 a light source 240 activates the metal-oxide bed to form OH.. The OH. react with contaminants in the waste water. The treated water is then collected through outlet 250. This system design allows for the handling of large flow rates (upflow packed bed reactor illustrated in FIG. 7c) by reducing back pressure using multiple TiO2-organic composite sin one reactor.

Both systems illustrated in FIGS. 7b and 7c utilize the $TiO_2$-organic composite which maintains a high specific surface area while eliminating the need for a downstream nanoparticle recovery system which simplifies processing thereby reducing processing costs. Both of these reactor systems do not require the use of acid or base additives to redisperse the nanoparticles or require a return line to recycle the nanoparticles as part of the recovery system.

To improve the performance of the solar photocatalysis (using the Sun for the UV or visible source) aluminum sheeting can be placed behind the reaction regions of the treatment systems. In embodiment 10, the treatment region 50 can comprise clear pipes. The pipe diameters are small to ensure adequate penetration of the light into the reactor. The addition of a reflecting material behind the reactors ensures maximum irradiation of the photocatalyst.

The disclosure provides synthesis of $TiO_2$ in a controlled hydrophilic synthetic polymer. Furthermore, composite $TiO_2$-organic structures can be fabricated and tailored to act as stand alone photocatalysts, eliminating the need for nanoparticle recovery systems, thereby reducing processing costs. FIG. 7b illustrates the use of the $TiO_2$-organic composite being used as a flow through filter that eliminating the need for a slurry type system that requires a downstream sedimentation step to recover the nanoparticles as described above. Furthermore to handle large flow rates an upflow packed bed reactor (illustrated in FIG. 7c) can be used to reduce back pressure which utilizes multiple $TiO_2$-organic composites in one reactor. Similar to the flow through filter the composite material maintains high surface area and eliminates the need for a down stream recovery system.

Due to increasing industry and technology, many new organic compounds are being discovered in ground and surface waters indicating that the current treatment technologies are not adequate. Due to the low selectivity of OH. to degrade organic compounds and the low cost, $TiO_2$ is a promising new technology to not only remove but degrade the compounds. Also hazardous byproducts will not be formed since the organics are completely mineralized unlike other oxidizing methods such as chlorine. Understanding the interactions of the nanoparticles in water will aid in the design and implementation of the nanosized photocatalysts for water and wastewater treatment. Therefore the use of the bulk composite $TiO_2$-organic structures which can be fabricated and tailored to act as a stand alone photocatalyst eliminates the need for nanoparticle recovery systems, thereby simplifying the processing and reducing processing costs.

A number of embodiments of the invention have been described. Nevertheless, it will be understood that various modifications may be made without departing from the spirit and scope of the invention. Accordingly, other embodiments are within the scope of the following claims.

What is claimed is:

1. A method, consisting of:
mixing a metal oxide precursor, metal sulfide precursor, metal selenide precursor, metal telluride precursor, metal nitride precursor, metal phosphide precursor, and/or metal arsenide precursor with a dispersing agent selected from the group consisting of phosphoglycerides; dioleylphosphatidyl ethanolamine (DOPE); dioleyloxypropyltriethylammonium (DOTMA); cholesterol; cholesterol ester; diacylglycerol; diacylglycerolsuccinate; diphosphatidyl glycerol (DPPG); hexanedecanol; fatty alcohols; polyethylene glycol (PEG); polyoxyethylene-9-lauryl ether; a surface active fatty acid, palmitic acid; oleic acid; fatty acids; fatty acid amides; sorbitan trioleate (Span 85); polysorbate 80 (TWEEN-80); sodium cholate methyl cellulose; gelatin; surfactin; a poloxomer; a sorbitan fatty acid ester; sorbitan trioleate; phosphatidylserine; phosphatidylinositol; phosphatidylethanolamine (cephalin); cardiolipin; phosphatidic acid; dicetylphosphate; dipalmitoylphosphatudylglycerol; stearylamine; dodecylamine; hexadecylamine; acetyl palmitate; glycerol ricinoleate; hexadecyl sterate; isopropyl myristate; tyloxapol; polyethylene glycol) 5000-phosphatidylethanolamine; polyvinyl alcohol (PVA); phospholipids; poloxamers, Poly(vinylphosphonic acid)Poly(acrylic acid), Poly(vinylsulfonic acid), Poly(methacrylic acid), poly (phosphonic acid) or any combinations thereof in a solvent at a desired pH under mild solution to hydrothermal conditions to promote the formation of a nanomaterial-dispersing agent composite at a desired size and/or geometry; and
pyrolizing the nanomaterial-dispersing agent composite at about 30-300° C. for about 1-72 hours to obtain a semi-conductive partial or fully porous nanoparticle-dispersant composite.

2. The method of claim 1, wherein the dispersing agent of the nanomaterial-dispersing agent composite is partially or fully pyrolyzed.

3. The method of claim 1, wherein the metal oxide precursor is selected from the group consisting of aluminum bis-ethylacetoacetate monoacetylacetonate, aluminum diacetylacetonate ethyl acetoacetate, aluminum monoacetylacetonate bis-propyl acetoacetate, aluminum monoacetylacetonate bisbutyl acetoacetate, aluminum monoacetylacetonate bishexyl acetoacetate, aluminum monoethyl acetoacetate bispropyl acetoacetonate, aluminum monoethyl acetoacetate bisbutyl acetoacetonate, aluminum monoethylacetoacetate bis-hexyl acetoacetonate, aluminum monoethylacetoacetate bisnonylacetoacetonate, aluminum dibutoxide monoacetoacetate, aluminum dipropoxide monoacetoacetate, aluminum butoxide monoethylacetoacetate, aluminum-s-butoxide bis(ethyl acetoacetate), aluminum di-s-butoxide ethyl acetoacetate, aluminum-9-octadecenyl acetoacetate diisopropoxide, titanium allylacetoacetate triisopropoxide, titanium di-n-butoxide (bis-2,4-pentanedionate), titanium diisopropoxide (bis-2,4-pentanedionate), titanium diisopropoxide bis(tetramethylheptanedionate), titanium diisopropoxide bis(ethyl acetoacetate), titanium bis ammonium lactato dihydroxide (TiBALDH), titanium methacryloxyethylacetoacetate triisopropoxide, titanium oxide bis(pentanedionate), titanium salts; titanium chloride and titanium sulfate, zirconium allylacetoacetate triisopropoxide, zirconium di-n-butoxide (bis-2,4-pentanedionate), zirconium diisopropoxide (bis-2,4-pentanedionate), zirconium diisopropoxide bis(tetramethylheptanedionate), zirconium diisopropoxide bis(ethylacetoacetate), zirconium methacryl i coxyethy l acetoacetate triisopropoxide, zirconium butoxide (acetylacetate) (bis-ethylacetoacetate), and iron acetylacetonate.

4. The method of claim 1, wherein the metal oxide precursor is titanium bis ammonium lactato dihydroxide (TiBALDH).

5. The method of claim 3, wherein the dispersing agent is polyvinyl alcohol.

6. The method of claim 1, wherein the solvent is a protic solvent.

7. The method of claim 1, wherein the pH is adjusted to between about 7.8 and 11.

8. The method of claim 1, wherein the metal oxide precursor is titanium bis ammonium lactato dihydroxide (TiBALDH) and the dispersing agent is polyvinyl alcohol.

9. The method of claim 8, wherein the pH is between about 7.8 and 11.

10. The method of claim 8, wherein the molar ratio of TiBALDH to poly(vinyl) alcohol (PVA) is between about 1:50 and 1:100,000.

11. The method of claim 1, wherein pyrolysis is carried out at about 150° C.

12. The method of claim 1, wherein pyrolysis is performed in an autoclave.

* * * * *